US006770682B2

(12) United States Patent  
Maruhashi et al.

(10) Patent No.: US 6,770,682 B2  
(45) Date of Patent: Aug. 3, 2004

(54) EXPANDABLE STYRENE RESIN BEADS AND FOAMS PRODUCED THEREFROM

(75) Inventors: Shotaro Maruhashi, Takasago (JP); Katsuhiko Wakishige, Takasago (JP); Yuichi Ueda, Takasago (JP); Hidekazu Oohara, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/169,140

(22) PCT Filed: Dec. 21, 2000

(86) PCT No.: PCT/JP00/09076

§ 371 (c)(1),  
(2), (4) Date: Jun. 27, 2002

(87) PCT Pub. No.: WO01/48068

PCT Pub. Date: Jul. 5, 2001

(65) Prior Publication Data

US 2003/0055119 A1 Mar. 20, 2003

(30) Foreign Application Priority Data

Dec. 28, 1999 (JP) .......................................... 11/372468

(51) Int. Cl.$^7$ ................................. C08J 9/18; C08J 9/20  
(52) U.S. Cl. ...................... 521/59; 521/139; 521/140  
(58) Field of Search ........................... 521/59, 139, 140

(56) References Cited

U.S. PATENT DOCUMENTS

| | | | |
|---|---|---|---|
| 3,770,663 A | | 11/1973 | Ueki et al. |
| 3,893,989 A | | 7/1975 | Leicht et al. |
| 4,409,338 A | * | 10/1983 | DiGiulio |
| 4,422,877 A | | 12/1983 | Spitzer et al. |
| 4,424,285 A | * | 1/1984 | DiGiulio |
| 4,483,809 A | | 11/1984 | Ando et al. |
| 4,506,037 A | | 3/1985 | Suzuki et al. |
| 4,587,270 A | | 5/1986 | Kuwabara et al. |
| 4,617,323 A | | 10/1986 | Kuwabara et al. |
| 4,626,555 A | | 12/1986 | Endo et al. |
| 4,676,939 A | | 6/1987 | Kuwabara |
| 4,689,351 A | | 8/1987 | Endo et al. |
| 4,695,593 A | | 9/1987 | Kuwabara et al. |
| 4,720,509 A | | 1/1988 | Nakamura |
| 4,761,431 A | | 8/1988 | Nakamura |
| 4,777,000 A | | 10/1988 | Kuwabara et al. |
| 4,830,798 A | | 5/1989 | Maeda |
| 4,840,973 A | | 6/1989 | Kuwabara et al. |
| 4,948,817 A | | 8/1990 | Kuwabara et al. |
| 5,053,435 A | | 10/1991 | Kuwabara et al. |
| 5,071,883 A | | 12/1991 | Kuwabara et al. |
| 5,229,049 A | | 7/1993 | Maeda et al. |
| 5,459,169 A | | 10/1995 | Tokoro et al. |
| 5,693,424 A | | 12/1997 | Watanabe et al. |
| 5,744,505 A | | 4/1998 | Fischer et al. |
| 5,747,549 A | | 5/1998 | Tsurugai et al. |
| 5,830,922 A | | 11/1998 | Wirobski et al. |
| 5,883,141 A | | 3/1999 | Mihayashi et al. |
| 5,880,166 A | * | 9/1999 | Gluck et al. |
| 5,968,430 A | | 10/1999 | Naito et al. |
| 6,013,687 A | | 1/2000 | Wirobski et al. |
| 6,051,617 A | | 4/2000 | Sasaki et al. |
| 6,077,875 A | | 6/2000 | Sasaki et al. |
| 6,221,926 B1 | * | 4/2001 | Oohara et al. |
| 6,355,696 B1 | | 3/2002 | Yamaguchi et al. |

FOREIGN PATENT DOCUMENTS

| | | |
|---|---|---|
| DE | 35 38 477 | 5/1986 |
| DE | 42 35 747 | 6/1994 |
| EP | 0 224 265 | 6/1987 |
| EP | 0 409 788 | 1/1991 |
| EP | 0 464 788 | 1/1992 |
| EP | 0 524 404 | 1/1993 |
| EP | 0 693 528 | 1/1996 |
| EP | 0 722 974 A1 | 7/1996 |
| EP | 0 775 722 | 5/1997 |
| EP | 0 960 904 A1 | 12/1999 |
| JP | 47-17465 | 5/1972 |
| JP | 47-18428 | 5/1972 |
| JP | 49-2183 | 1/1974 |
| JP | 52-77174 | 6/1977 |
| JP | 54-158467 | 12/1979 |
| JP | 56-67344 | 6/1981 |
| JP | 57-170725 | 10/1982 |
| JP | 58-62024 | 4/1983 |
| JP | 60-90228 | 5/1985 |
| JP | 60-188435 | 9/1985 |
| JP | 60-221440 | 11/1985 |
| JP | 61-4738 | 1/1986 |
| JP | 62-115042 | 5/1987 |
| JP | 3-254930 | 11/1991 |
| JP | 4-331247 | 11/1992 |
| JP | 6-49263 | 2/1994 |
| JP | 06049263 | 2/1994 |
| JP | 7-90105 | 4/1995 |
| JP | 7-138399 | 5/1995 |
| JP | 8-20662 | 1/1996 |
| WO | WO98/29485 | 7/1998 |

OTHER PUBLICATIONS

English language translation of the International Preliminary Examination Report.  
U.S. patent application Ser. No. 09/155,544, Mogami et al., filed Sep. 25, 1998.  
U.S. patent application Ser. No. 09/509,502, Yamaguchi et al., filed Mar. 29, 2000.

* cited by examiner

*Primary Examiner*—Morton Foelak  
(74) *Attorney, Agent, or Firm*—Leydig, Voit & Mayer, Ltd.

(57) ABSTRACT

Foamable modified polystyrene resin particles which are foamable modified polystyrene resin particles (d) comprising modified polystyrene resin particles (c) containing a blowing agent (e); the modified polystyrene resin particles (c) comprising a polystyrene resin and rubber polymer particles (b) being dispersed in the resin, wherein the rubber polymer particles (b) are dispersed uniformly throughout a continuous phase of the polystyrene resin or in a state of a density of the particles (b) being higher in a center portion of the resin particle than in a surface layer portion thereof, and the modified polystyrene resin particles (c) are modified polystyrene resin particles prepared by impregnating a monomer mixture consisting essentially of a styrene monomer and a conjugated diene monomer and comprising the styrene monomer in a larger amount than the conjugated diene monomer, into polystyrene resin particles (a) and carrying out copolymerization.

20 Claims, 7 Drawing Sheets

0.5μm 0.5 μm 0.5 μm 0.5μm 0.5μm 0.5μm 0.5μm

EXPANDABLE STYRENE RESIN BEADS AND FOAMS PRODUCED THEREFROM

TECHNICAL FIELD

The present invention relates to foamable modified polystyrene resin particles, a process for preparation of the resin particles, a foamed article which is produced by using the resin particles and has excellent balance of break resistance and cushioning property and a process for production of the foamed article.

BACKGROUND ART

It is well known that a foamed article produced by expanding foamable polystyrene resin particles obtained by impregnating polystyrene resin particles with a blowing agent is broken easily. To improve such a defect, there has been proposed a process for mechanically blending a styrene-butadiene block copolymer with a polystyrene resin (cf. JP-B-47-17465 and JP-A-54-158467), a process for mixing a styrene-butadiene block copolymer and a polybutadiene resin in a solvent to obtain a phase-separated microstructure by a solvent casting method (cf. JP-A-56-67344) and a process employing particles of a resin, so-called high impact polystyrene resin (HIPS) particles which are excellent in impact strength and are prepared by polymerizing a styrene monomer in the presence of conjugated diene polymer (JP-B-47-18428 and JP-A-7-90105).

However it is necessary that those foamable polystyrene resin particles are subjected to pelletizing through extrusion molding, which results in increase in cost. Further in case of a commercially available high impact polystyrene resin, a molecular weight of its polystyrene cannot be increased beyond a certain level.

As a method for improving break resistance at low cost, an impregnation polymerization method for polymerizing by impregnating styrene polymer particles with a conjugated diene monomer, or the like.

For example, JP-A-6-49263 discloses foamable polystyrene resin particles prepared by copolymerizing a monomer mixture of a styrene monomer and a conjugated diene monomer in a state of the monomer mixture being impregnated around the surface portion of polystyrene resin particles to give polystyrene resin particles containing the obtained conjugated diene copolymer gathering densely around the surface portion of the resin particle, and then impregnating the polystyrene resin particles with a blowing agent. Also it is disclosed that the center portion of the foamable resin particle is rich with polystyrene and, since the blowing agent is kept in the center portion, the resin particles having high expansion ratio can be obtained. Further it is disclosed that the monomer mixture is a mixture of 10 to 55% by weight of styrene monomer and 90 to 45% by weight of conjugated diene monomer. However in all the examples thereof, the conjugated diene monomer is used in an amount of not less than 1.5 times that of the styrene monomer and an object of that invention is to obtain polystyrene resin particles, in which a conjugated diene copolymer gathers densely around the surface portion of the resin particle and the center portion of the foamable resin particle is rich with polystyrene. From that point of view, only a monomer mixture comprising the conjugated diene monomer in a larger proportion essentially is disclosed.

The process mentioned above does not require a pelletizing step and is excellent from the viewpoint of cost. However the obtained foamed article, particularly the foamed article produced by molding pre-expanded particles within a mold is low in percentage of fused particles (fusion rate) and is insufficient in break resistance (in impact strength by a falling weight method) because the conjugated diene polymer particles are present densely around the surface portion of the resin particle.

Also in WO98/29485, there is disclosed foamable modified polystyrene resin particles obtained by polymerizing a conjugated diene monomer in polystyrene resin particles to form rubber particles of conjugated diene polymer in a uniformly dispersed state in the polystyrene resin particles, impregnating and polymerizing a styrene monomer in the obtained polystyrene resin containing rubber particles and then impregnating the obtained modified polystyrene resin with a blowing agent. Those foamable resin particles are characterized in that when they are expanded, there is substantially no deformation of the rubber particles before and after the expansion and an Izod impact strength of the modified polystyrene resin itself before expanded is lower than that of conventional resin called high impact polystyrene (HIPS). Also though the publication WO98/29485 discloses impregnation and polymerization of a styrene monomer and a conjugated diene monomer, a mixing ratio thereof disclosed is only 5:10 (weight ratio) in example of the publication. In this case, too, a monomer mixture being rich with the conjugated diene monomer is used.

The process mentioned above does not necessitate a pelletizing step and is excellent from the viewpoint of cost. Also a fusion rate of pre-expanded particles in a foamed article obtained by expanding them in mold is high and a break resistance (impact strength by a falling weight method) is improved as compared with the foamed article disclosed in the above-mentioned JP-A-6-49263 but an obtained foamed article is not equal to a foamed article of commercially available high impact polystyrene (HIPS) in case of expanding at high expansion ratio (about 50 times or more) into a foamed article having a density of not more than 0.02 g/cm$^3$.

As mentioned above, the impregnation polymerization method does not necessitate a pelletizing step and can enhance break resistance of polystyrene resin foamed article at low cost. However it was difficult to attain break resistance equal to that of a foamed article obtained by using high impact polystyrene (HIPS) particles.

An object of the present invention is to provide foamable modified polystyrene resin particles which can be produced without a pelletizing step and gives a foamed article having excellent break resistance and cushioning property even at high expansion ratio, a process for preparation thereof and a foamed article obtained by expanding the resin particles.

DISCLOSURE OF INVENTION

Namely the present invention relates to foamable modified polystyrene resin particles which are foamable modified polystyrene resin particles (d) comprising modified polystyrene resin particles (c) containing a blowing agent (e); the modified polystyrene resin particles (c) comprise rubber polymer particles (b) dispersed in a polystyrene resin, wherein the rubber polymer particles (b) are dispersed uniformly throughout a continuous phase of the polystyrene resin or in a state of a density of the particles (b) being higher in a center portion of the resin particle than in a surface layer portion thereof, and the modified polystyrene resin particles (c) are modified polystyrene resin particles (c1) obtained by impregnating a monomer mixture consisting essentially of a styrene monomer and a conjugated diene monomer into polystyrene resin particles (a) and carrying out copolymerization, said monomer mixture being containing the styrene monomer in a larger amount than the conjugated diene monomer.

The modified polystyrene resin particles (c) may be modified polystyrene resin particles (c2) obtained by impregnating the monomer mixture consisting essentially of the styrene monomer and the conjugated diene monomer in the polystyrene resin particle (a) and carrying our copolymerization; said monomer mixture containing the styrene monomer in a larger amount than the conjugated diene monomer to give the modified polystyrene resin particles (c1) and further subjecting the obtained polystyrene resin particles to impregnation polymerization of a styrene monomer.

It is preferable that the above-mentioned rubber polymer particles (b) consists essentially of a copolymer of the styrene monomer and the conjugated diene monomer.

It is preferable that the modified polystyrene resin particles (c1) are prepared by impregnating 40 to 10 parts by weight of the monomer mixture into 60 to 90 parts by weight of polystyrene polymer particle (a) and carrying out copolymerization; said monomer mixture comprising the styrene monomer of more than 55% by weight and not more than 90% by weight and the conjugated diene monomer of more than 10% by weight and less than 45% by weight.

Provided that when the foamable modified polystyrene resin particles (d) are molded into a modified polystyrene resin foamed article having a density of 0.02 g/cm$^3$, a cushioning coefficient of the foamed article is represented by A and a 50% failure height thereof according to falling weight method is represented by B, and that when foamable un-modified polystyrene resin particles (f) prepared by impregnating the polystyrene resin particles (a) with the blowing agent (e) are molded into an un-modified polystyrene resin foamed article having a density of 0.02 g/cm$^3$, a cushioning coefficient of the foamed article is represented by C and a 50% failure height thereof according to falling weight method is represented by D, it is preferable that the modified polystyrene resin foamed article has a relation that A/C is 1.00 to 1.08 and B/D is 1.35 to 2.35.

Also it is preferable that the rubber polymer particles (b) being present in the center portion of the foamable modified polystyrene resin particles (d) have a circle equivalent diameter of average area of 0.01 to 0.20 μm or a gel content of the modified polystyrene resin particles (c) is 15 to 40% by weight.

Further it is preferable that the above-mentioned rubber polymer particles (b) are flattened in cell membrane of the modified polystyrene resin foamed article obtained by expanding the foamable modified polystyrene resin particles, and particularly an average flatness of the rubber polymer particles (b) flattened in a cell membrane of the modified polystyrene resin foamed article obtained by expanding the foamable modified polystyrene resin particles (d) so that the foamed article has a density of 0.02 g/cm$_3$ is within a range of 1.1 to 9.

Further the present invention relates to foamable modified polystyrene resin particles which are foamable modified polystyrene resin particles (d) comprising modified polystyrene resin particles (c) containing a blowing agent (e); the modified polystyrene resin particles (c) comprise rubber polymer particles (b) dispersed in a polystyrene resin,
wherein the rubber polymer particles (b) are dispersed uniformly throughout a continuous phase of the polystyrene resin or in a state of a density of the particles (b) being higher in a center portion of the resin particle than in a surface layer portion thereof, and provided that when the foamable modified polystyrene resin particles (d) are molded into a modified polystyrene resin foamed article having a density of 0.02 g/cm$^3$, a cushioning coefficient of the foamed article is represented by A and a 50% failure height thereof according to falling weight method is represented by B, and that when foamable unmodified polystyrene resin particles (f) prepared by impregnating polystyrene resin particles (a) with a blowing agent (e) are molded into an un-modified polystyrene resin foamed article having a density of 0.02 g/cm$^3$, a cushioning coefficient of the foamed article is represented by C and a 50% failure height thereof according to falling weight method is represented by D, the modified polystyrene resin foamed article has a relation that A/C is 1.00 to 1.08 and B/D is 1.35 to 2.35.

Also in those foamable modified polystyrene resin particles, it is desirable that the above-mentioned rubber polymer particles (b) are particles of a copolymer consisting essentially of the styrene monomer and the conjugated diene monomer.

Also it is preferable that the rubber polymer particles (b) being present in the center portion of the foamable modified polystyrene resin particles (d) have a circle equivalent diameter of average area of 0.01 to 0.20 μm or a gel content of the modified polystyrene resin particles (c) is 15 to 40% by weight.

Still further the present invention relates to foamable modified polystyrene resin particles which are foamable modified polystyrene resin particles (d) comprising modified polystyrene resin particles (c) containing a blowing agent (e); the modified polystyrene resin particles (c) comprise rubber polymer particles (b) dispersed in a polystyrene resin,
wherein the rubber polymer particles (b) are dispersed uniformly throughout a continuous phase of the polystyrene resin or in a state of a density of the particles (b) being higher in a center portion of the resin particle than in a surface layer portion thereof, and the rubber polymer particles (b) are flattened in a cell membrane of a modified polystyrene resin foamed article obtained by expanding the foamable modified polystyrene resin particles (d).

It is desirable that the above-mentioned rubber polymer particles (b) are particles of a copolymer consisting essentially of the styrene monomer and the conjugated diene monomer.

Provided that when the foamable modified polystyrene resin particles (d) are molded into a modified polystyrene resin foamed article having a density of 0.02 g/cm$^3$, a cushioning coefficient of the foamed article is represented by A and a 50% failure height thereof according to falling weight method is represented by B, and that when foamable un-modified polystyrene, resin particles (f) prepared by impregnating polystyrene resin particles (a) with a blowing agent (e) are molded into an un-modified polystyrene resin foamed article having a density of 0.02 g/cm$^3$, a cushioning coefficient of the foamed article is represented by C and a 50% failure height thereof according to falling weight method is represented by D, it is preferable that the modified polystyrene resin foamed article has a relation that A/C is 1.00 to 1.08 and B/D is 1.35 to 2.35.

Also it is preferable that the rubber polymer particles (b) being present in the center portion of the foamable modified polystyrene resin particles (d) have a circle equivalent diameter of average area of 0.01 to 0.20 μm or a gel content of the modified polystyrene resin particles (c) is 15 to 40% by weight.

It is preferable that an average flatness of the rubber polymer particles (b) flattened in a cell membrane of the modified polystyrene resin foamed article obtained by expanding the foamable modified polystyrene resin particles (d) and having a density of 0.02 g/cm$^3$ is in a range of 1.1 to 9.

Also the present invention relates to the modified polystyrene resin foamed article having a cell membrane of modified polystyrene resin comprising a polyester resin and rubber polymer particles (b) dispersed in the resin, wherein the rubber polymer particles (b) are flattened in the cell membrane, and an average flatness of the flattened rubber polymer particles (b) in the cell membrane of the modified polystyrene resin foamed article having a density of 0.02 g/cm$^3$ is in a range of 1.5 to 8.

It is desirable that the above-mentioned rubber polymer particles (b) are particles of a copolymer substantially comprising the styrene monomer and the conjugated diene monomer.

Provided that a cushioning coefficient of the modified polystyrene resin foamed article having a density of 0.02 g/cm$^3$ is represented by A and a 50% failure height thereof according to falling weight method is represented by B, and that a cushioning coefficient of a foamed article of unmodified polystyrene resin containing no rubber polymer particles and having a density of 0.02 g/cm$^3$ is represented by C and a 50% failure height thereof according to falling weight method is represented by D, it is preferable that the modified polystyrene resin foamed article has a relation that A/C is 1.00 to 1.08 and B/D is 1.35 to 2.35.

Further the present invention relates to the modified polystyrene resin foamed article obtained by expanding the above-mentioned foamable modified polystyrene resin particles and the process for producing the modified polystyrene resin foamed article by expanding the above-mentioned foamable modified polystyrene resin particles.

Still further the present invention relates to the process for producing the foamable modified polystyrene resin particles which comprises:

impregnating a monomer mixture consisting essentially of the styrene monomer and the conjugated diene monomer and comprising the styrene monomer in a larger amount than the conjugated diene monomer, into the polystyrene resin particle (a) and carrying out copolymerization to give modified polystyrene resin particles (c1), wherein rubber polymer particles (b) are dispersed uniformly throughout a continuous phase of the polystyrene resin or in a state of a density of the particles (b) being higher in a center portion of the resin particle than in a surface layer portion thereof, and then impregnating the modified polystyrene resin particles (c1) with a blowing agent (e), and further relates to the process for producing the foamable modified polystyrene resin particles which comprises:

impregnation-polymerizing the modified polystyrene resin particles (c1) with a styrene monomer to give the modified polystyrene resin particles (c2) and then impregnating the modified polystyrene resin particles (c2) with the blowing agent (e).

In the impregnation polymerization of those production processes for obtaining the modified polystyrene resin particles (c1), it is preferable that 40 to 10 parts by weight of the monomer mixture is impregnated into 60 to 90 parts by weight of the polystyrene polymer particles (a) and the monomer mixture comprising a styrene monomer of more than 55% by weight and not more than 90% by weight and a conjugated diene monomer of more than 10% by weight and less than 45% by weight is used.

The "foamed article" used herein encompasses pre-expanded particles obtained by expanding the foamable resin particles and a molded article obtained by molding the pre-expanded particles in a mold, both of which are described hereinafter. Unless otherwise noted, the word "foamed article" means the both of them.

Prior to explaining the present invention, explanations of the words used in the present invention are made below.

In the present invention, the state of the rubber polymer particles (b) "being dispersed uniformly throughout the polystyrene resin particle (a) or a density thereof being higher in a center portion of the resin particle than in a surface layer portion of the resin particle" means that the distributing state of the rubber polymer particles (b) does not differ between the surface layer portion and the center portion of the polystyrene resin particle (a) or is sparser in the surface layer portion.

In the present invention, the "surface layer portion" means a portion defined between the depth of 2 µm to 6 µm from the surface of the modified polystyrene resin particle (c) toward the center thereof. The "center portion" means a sphere portion having a radius of 50 µm, the center of said sphere portion being the center of the modified polystyrene resin particle, provided that the particle is a sphere.

The concrete measuring method is explained below by using photographs of the modified polystyrene resin particle prepared in Example 2 mentioned hereinafter, which were taken with a transmission electron microscope (TEM). FIG. 1 is a TEM photograph (×40000) of the "center portion", and FIG. 2 is a TEM photograph (×40000) of the "surface layer portion". FIGS. 3 (In FIG. 3, X mark represents the center of the particle) and 4 are photocopies of FIGS. 1 and 2, respectively for measuring an area percentage (%) of the rubber particles.

The area percentage (%) of the rubber particles is measured and calculated as follows.

First an area A (1.25 µm×1.25 µm) surrounded by a full line in FIGS. 3 and 4 is enlarged by four times with a copying machine, respectively, and a weight thereof is measured. Black region (rubber polymer particles dyed with osmium oxide) are cut off (in case of rubber polymer particles containing occlusion polystyrene particles therein, a region of the rubber polymer particles containing the occlusion polystyrene particles is cut off as it is), and a weight of the cut portions B (or remaining portions after cutting off) is measured. The area percentage (%) of the rubber particles is represented by (cut portions B/total area A)×100. In FIG. 1 (FIG. 3) and FIG. 2 (FIG. 4), the area percentage is 38.4% and 25.5%, respectively.

Then the "area ratio of rubber particles" of the "surface layer portion" to the "center portion" is calculated.

$$\text{Area ratio of rubber particles} = \frac{\text{Area percentage (\%) of rubber particles of surface layer portion}}{\text{Area percentage (\%) of rubber particles of center portion}}$$

In the present invention, the state of "being uniformly dispersed throughout or a density being higher in the center portion than in the surface layer portion" is as mentioned above. From an aspect of "an area ratio of the rubber particles", the area ratio is preferably from 0.10 to 1.15, more preferably 0.30 to 1.15, particularly preferably 0.50 to 1.15.

When the area ratio of rubber particles exceeds 1.15, there is a tendency that fusion between the pre-expanded particles at the time of in-mold molding is inferior. Since the foamable modified polystyrene resin particles of the present invention are uniform throughout or a density of the rubber polymer particles is higher in the center portion than in the surface layer portion, the fusion between the pre-expanded particles is easy and in-mold molding is easy.

In the present invention, the "cushioning coefficient ratio (A/C)" means the following value.

First the cushioning coefficient is a minimum cushioning coefficient when a 14 kg of a weight is dropped from a height of 60 cm onto a 90 mm×90 mm×50 mm sample of expanded foamed article and the sample is deformed by 50 to 65% as compared with the sample before the test according to JIS Z 0235. In the concrete measurement and calculation, first a reference cushioning coefficient C of a foamed article obtained by in-mold molding of un-modified polystyrene resin particles under the expansion-molding conditions mentioned hereinafter is measured, and then a cushioning coefficient A of a foamed article obtained by expansion-molding of polystyrene resin particles to be tested under the same expansion-molding conditions is measured. The A/C is called a cushioning coefficient ratio. The smaller the ratio is, the better the cushioning characteristic is.

The "impact strength ratio (B/D) according to the falling weight method" of the present invention means a value obtained as follows.

According to JIS K 7211, a 321 g steel ball is dropped on a 200 mm×20 mm×40 mm test piece of a foamed article and a 50% failure height which causes rupture of 50% of the number of test pieces of the foamed article is calculated by the following equation:

$$H_{50} = H_i + d\left[\frac{\sum (i \cdot n_i)}{N} \pm 0.5\right]$$

where $H_{50}$: A 50% failure height (cm) which causes rupture of 50% of the number of test pieces of the foamed article $H_i$: Test height (cm) when the height level (i) is zero, representing the height anticipated to cause the rupture of the test piece d: Height interval (cm) for increasing or decreasing the test height i: Height level which increases or decreases by one, taking the value of zero when the test height is $H_1$ (i= - - - -3, -2, -1, 0, 1, 2, 3, - - -)

$n_i$: Number of test pieces which break (or do not break) at each height level

N: Total number of test pieces which break (or do not break) (N=$\Sigma n_i$)

Whichever is the larger of the number of broken and unbroken test pieces shall be used. In case where the numbers are the same, either one may be used.

±0.5: This value shall be negative when using the data when broken and be positive when using the data when unbroken.

In the concrete measurement and calculation, first a reference 50% failure height D of a foamed article obtained by in-mold molding of un-modified polystyrene resin particles under the expansion-molding conditions mentioned hereinafter is measured, and then a 50% failure height B of a foamed article obtained by expansion-molding of polystyrene resin particles to be tested under the same expansion-molding conditions is measured. The B/D is called an impact strength ratio according to the falling weight method. The larger the ratio is, the higher the break resistance is.

In the present invention, the "density" means the following value.

A density D (g/cm$^3$) of the foamed article is obtained by the following equation according to JIS K 6767.

$$D=G/V$$

wherein
G: Weight of foamed article (g),
V: Volume of foamed article (cm$_3$)

V is calculated by cutting a part of the foamed article into a rectangular parallelepiped and measuring a depth, width and height thereof. Measuring tools and accuracy of measurement are according to JIS K 6767.

The expansion-molding conditions for the measurements of the above-mentioned impact strength ratio and cushioning coefficient ratio are as follows. Those conditions are used also in examples and comparative examples described hereinafter.

Pre-Expansion Conditions
Foamable resin particles
  Average particle size: 1 mm
  Blowing agent: Pentane (normal/iso=40/60)
  A normal pressure pre-expanding equipment which was pre-heated is charged with 1 to 2 kg of foamable resin particles, followed by passing steam at about 0.061 MPa and introducing air properly with stirring. Thus the particles are expanded up to a given expansion ratio in about 1 minute to about 3 minutes.

In-Mold Molding Conditions
  After molding under the following conditions, a foamed article is allowed to stand for vacuum cooling.
  Molding machine: TH90VMII available from Toyo Kikai Kinzoku Kabushiki Kaisha
  Density after molding: 0.02 g/cm$^3$ (expansion ratio: about 50 times)
  Molding conditions:
    Pre-steaming: 3 seconds
    One-way steaming: 4 seconds
    Opposite steaming: 1 second
    Autoclave steaming: 12 seconds
    Additional steaming: 3 seconds
    Retaining: 3 seconds
    Water cooling: 20 seconds
  Set steam pressure at the heating from both sides:
    Cavity/core=0.066/0.087 (MPa)

In the present invention the "average flatness" of the rubber polymer particles (b) in the cell membrane of the foamed article is determined as follows. Those conditions are used also in examples and comparative examples described hereinafter.

The foamable resin particles are expansion-molded by the above-mentioned method to give a foamed article having a density of 0.02 g/cm$^3$. The rubber polymer particles in the cell membrane of the foamed article are dyed with osmium oxide, followed by viewing with a transmission electron microscope (JEM-1200EX available from Nippon Denshi Kabushiki Kaisha, ×7200 to ×40000). Then with respect to 100 flattened rubber polymer particles, a dimension thereof in the cell membrane direction and a dimension in a thickness direction thereof are measured. A value obtained by dividing the dimension in the cell membrane direction by the dimension in the thickness direction is assumed to be a flatness. An average value of the flatness of the rubber polymer particles having a flatness of not less than 1.1 is assumed to be an average flatness.

In the present invention the "circle equivalent diameter of average area" of the rubber polymer particles (b) in the center portion of the foamable modified polystyrene resin particle (d) is determined as follows. Those conditions are used also in examples and comparative examples described hereinafter.

The rubber polymer particles in the foamable resin particle are dyed with osmium oxide, and with a transmission electron microscope (JEM-1200EX available from Nippon Denshi Kabushiki Kaisha, ×40000), a photograph was taken. An area of 3.76 $\mu m^2$ calculated from a scale (0.5 $\mu m$) on the photograph was enlarged by four times and photocopied and a black rubber portion dyed with osmium oxide of the photocopy is cut off (in case of rubber polymer particles containing occlusion polystyrene particles therein, a region of the rubber polymer particles containing the occlusion polystyrene particles is cut off as it is), and a weight E g of all the cut portions of rubber polymer particles is measured. Then the weight E g of the cut pieces of paper is divided by the number F of rubber polymer particles and an average weight G g of the rubber polymer particles is calculated. Separately a portion of the photocopy including the scale (0.5 $\mu m$) was enlarged by four times similarly and photocopied. The enlarged portion equivalent to 0.25 $\mu m^2$ is cut off and its weight is measured to determine a weight H g of the paper equivalent to 0.25 $\mu m^2$. An area per 1 g of paper, i.e. I $\mu m^2/g$ is calculated by dividing 0.25 $\mu m^2$ by the paper weight H g equivalent to 0.25 $\mu m^2$. Then an average area J $\mu m^2$ of the rubber polymer particles is calculated by multiplying the average weight G g of the rubber polymer particles by the area per 1 g of paper, i.e. I $\mu m^2/g$. This average area J $\mu m^2$ of the rubber polymer particles is divided by number $\pi$ and a root of the obtained value is multiplied by 2. The thus obtained value is assumed to be a circle equivalent diameter of average area K $\mu m$. Herein the measurements were made by using FIGS. 1 and 2 used for obtaining the rubber portion area ratio.

The "center portion" means a sphere portion having a radius of 50 $\mu m$, the center of said sphere portion being the center of the foamable modified polystyrene resin particle, provided that the particle is a sphere.

In the present invention the "gel content" is obtained as follows.

0.5 Gram of foamable modified polystyrene resin particles is put in a solution comprising 31.8 ml of methyl ethyl ketone and 3.2 ml of methanol. After stirring for eight hours or more, a portion of solution (dissolved portion) is separated from a gel portion (insoluble portion) by centrifugal separation (for 30 minutes at 15,000 rpm), and the portion of solution is removed. Then a solution comprising 31.8 ml of methyl ethyl ketone and 3.2 ml of methanol is added, followed by stirring at 30° C. for 30 minutes and separating a portion of solution from a gel portion by centrifugal separation (for 30 minutes at 15,000 rpm). The portion of solution is removed. Further a solution comprising 31.8 ml of methyl ethyl ketone and 3.2 ml of methanol is added, followed by stirring at 50° C. for 30 minutes and separating a portion of solution from a gel portion by centrifugal separation (for 30 minutes at 15,000 rpm). Then the portion of solution is removed and the obtained gel portion is dried at 60° C. for eight hours to measure a weight of the gel portion. Thus a weight of the gel portion contained in 0.5 g of foamable modified polystyrene resin particles is calculated. The obtained value is assumed to be a gel content.

BEST MODE FOR CARRYING OUT THE INVENTION

Figure 1:
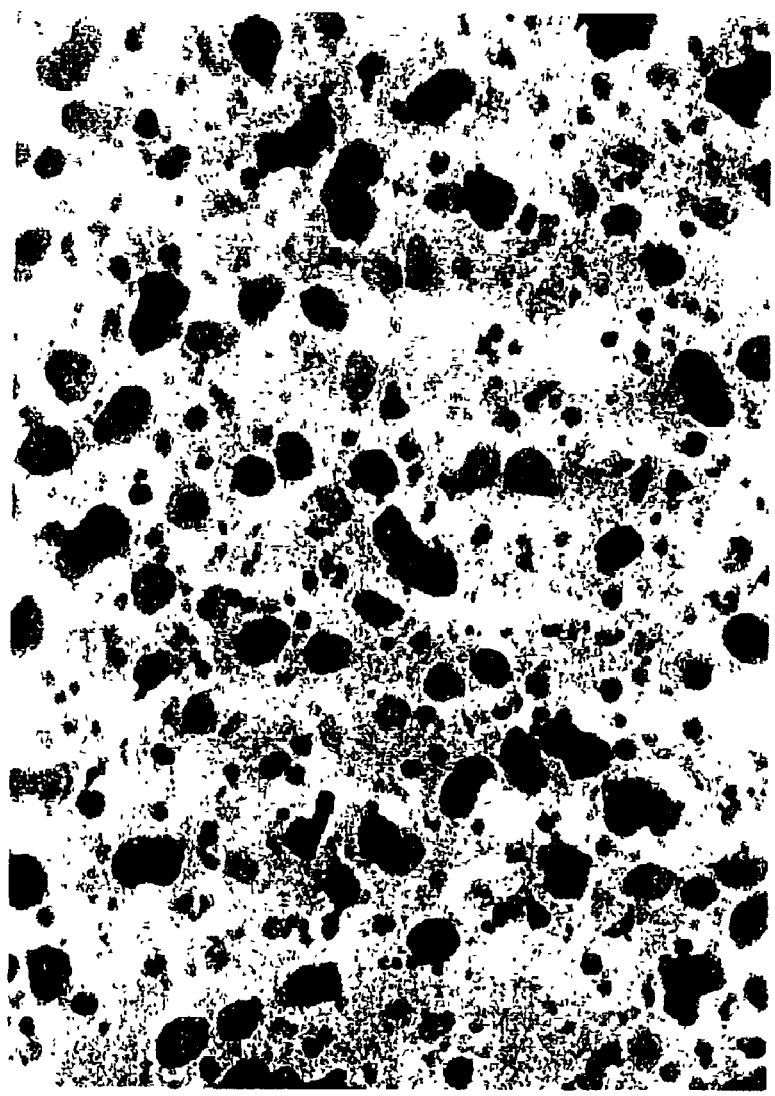
FIG. 1 is a photograph (×40000) of a transmission electron microscope showing the center portion of the foamable modified polystyrene resin particle obtained in Example 2 of the present invention.
Figure 2:
FIG. 2 is a photograph (×40000) of a transmission electron microscope showing the surface portion of the foamable modified polystyrene resin particle obtained in Example 2 of the present invention.
Figure 3:
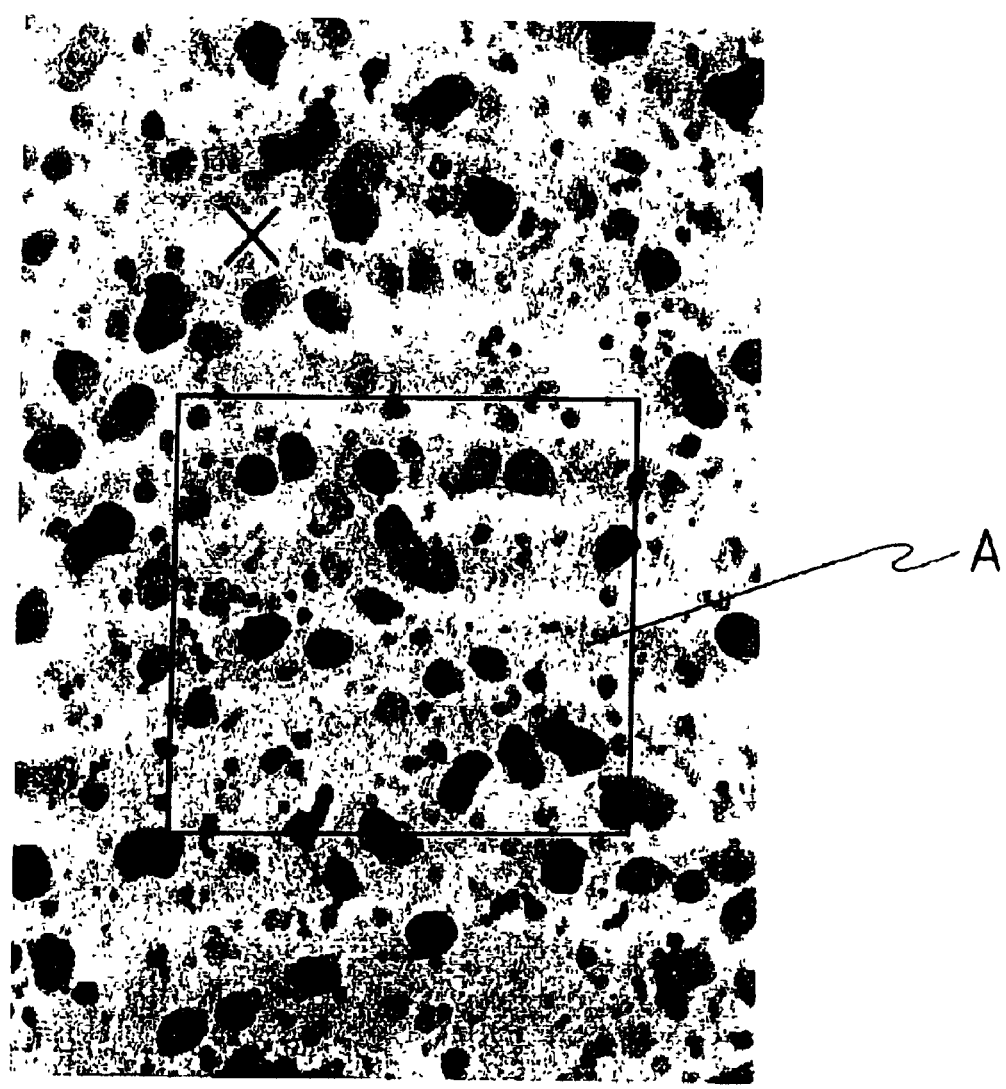
FIG. 3 is a photocopy of FIG. 1 for explaining measuring methods of an area percentage of rubber particles and an area ratio of rubber particles.
Figure 4:
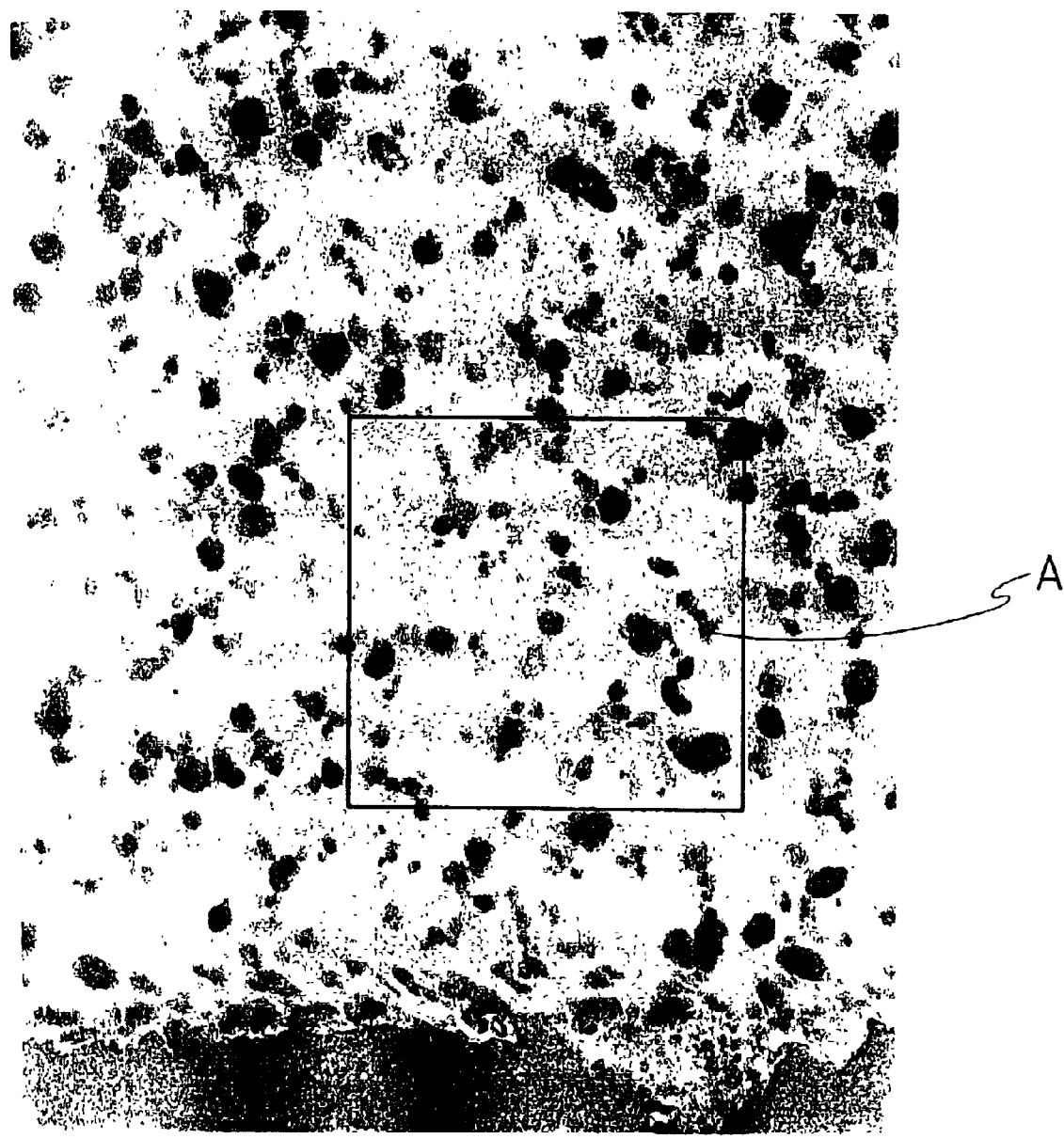
FIG. 4 is a photocopy of FIG. 2 for explaining measuring methods of an area percentage of rubber particles and an area ratio of rubber particles.

Firstly a preferred preparation process of the foamable modified polystyrene resin particles of the present invention is explained below.

This preparation process is a process for producing the modified polystyrene resin particles (c) by impregnating the monomer mixture consisting essentially of the styrene monomer and the conjugated diene monomer into the polystyrene polymer particles (a) and then carrying out copolymerization with the monomer mixture being containing the styrene monomer in a larger amount than the conjugated diene monomer. This impregnation polymerization is hereinafter referred to as the first impregnation polymerization, and the obtained polystyrene resin particles are called the modified polystyrene resin particles (c1). If necessary, the resin particles may be subjected to the second impregnation polymerization described later.

The preparation process is analogous to the preparation processes described in the above-mentioned JP-A-6-49263 and WO98/29485, but substantially differs from them from a point that in the monomer mixture used in the impregnation polymerization, a proportion of the styrene monomer is larger than that of the conjugated diene monomer. As a result, there arise a big difference in physical properties and performance with respect to the obtained modified resin particles and foamed article obtained by expanding them.

In cases of the inventions disclosed in the above-mentioned publications, a rubber component is intended to be increased, and as a result, a mixing ratio of the conjugated diene monomer is increased.

However in the present invention, a conception is entirely reversed, and an amount of the styrene monomer is made larger than that of the conjugated diene monomer in the monomer mixture.

As a result, (1) since the rubber polymer particles (b) are dispersed uniformly throughout a continuous phase of the polystyrene resin or in a state of a density of the particles (b) being higher in the center portion of the resin particle than in the surface layer portion thereof, good fusion between the pre-expanded particles is obtained when a foamed article is produced by in-mold molding, and further (2) in the modified polystyrene resin foamed article, the rubber polymer particles (b) dispersed in the cell membrane of the obtained modified polystyrene resin are properly flattened and thereby a foamed article having an excellent break resistance and a good balance of break resistance and cushioning property can be provided.

The foamable modified polystyrene resin particles (d) of the present invention explicitly differs from the resin particles of JP-A-6-49263 in the above-mentioned point (1) because rubber polymer particles of the latter resin particles are present densely in a surface portion. Further from the viewpoint of the above (2), the resin particles of the present invention explicitly differs from resin particles of WO98/29485 in which there is substantially no deformation of the rubber particles before and after the expansion. Further from the viewpoint of the above (2), the resin particles of the present invention differs from conventional high impact polystyrene resin (HIPS) particles in which rubber polymer particles are flattened in the form of string in a cell membrane when expanded. The difference from HIPS is described later.

Explained below are preparation steps and conditions. However the present invention is not limited to them.

First preferably 40 to 10 parts by weight of monomer mixture comprising the styrene monomer and the conjugated diene monomer and comprising the styrene monomer in a larger amount than the conjugated dine monomer is impregnated into preferably 60 to 90 parts by weight of polystyrene resin particles (a) and polymerization is carried out. This polymerization is called the first impregnation polymerization. The monomers to be mixed may be mixed in the polystyrene resin particles. The styrene monomer and conjugated diene monomer may be impregnated separately in the polystyrene resin particles. When the polystyrene resin particles (a) are less than 60 parts by weight, in some cases a polymerization system becomes unstable when impregnating the monomer mixture. When more than 90 parts by weight, there is a case where break resistance of a foamed article produced from the obtained resin particles becomes insufficient. An amount of the polystyrene resin particles (a) is further preferably 65 to 85 parts by weight.

In the monomer mixture, an amount of the styrene monomer is larger than that of the conjugated diene monomer, and is preferably more than 55% by weight and not more than 90% by weight, more preferably 60to 85% by weight, further preferably 60to 80% by weight from the viewpoint of enhancing break resistance.

In the impregnation of the monomer mixture into the polystyrene resin particles (a), it is important to carry out the impregnation of the monomer mixture sufficiently into the inside of the polystyrene resin particles (a) before the polymerization.

With respect to the polystyrene resin particles (a) which are raw materials to be used in the present invention, there may be used conventional polystyrene resin. Examples thereof are styrene homopolymer and a copolymer of styrene with other monomer. Examples of the other monomer are an unsaturated fatty acid ester such as methyl methacrylate or butyl acrylate, an unsaturated fatty acid such as acrylic acid, methacrylic acid or maleic anhydride, α-methylstyrene, and acrylonitrile. Unlike the conventional high impact polystyrene (HIPS), a weight average molecular weight can be adjusted optionally in a range of about 150,000 to about 600,000. The weight average molecular weight is not less than about 250,000, preferably not less than 300,000 from the viewpoint of giving good break resistance to a foamed article, and is not more than about 500,000, preferably not more than about 400,000 from a point that an expansion rate is within a proper range.

As the polystyrene resin particles (a), since those prepared through conventional suspension polymerization method can be used as they are, no specific pelletizing step is required. It is a matter of course that those obtained by bulk polymerization, emulsion polymerization, solution polymerization or the like, and pulverized if necessary can be used. It is preferable that the average particle size is from about 0.1 mm to about 3 mm, usually from 0.5 to 1.5 mm.

To the raw polystyrene resin particles (a) may be added conventional additives such as a nucleating agent, filler, plasticizer, flame retarder, lubricant, coloring agent, ultraviolet ray absorber and antioxidant in an amount not impairing effects of the present invention.

Then the monomer mixture to be used in the present invention is explained below. Examples of the conjugated diene monomer to be used in the present invention are one or more of butadiene, isoprene, chloroprene, 1,4-pentadiene, 1,5-hexadiene and the like. Butadiene is particularly preferable. An amount the conjugated diene monomer to be subjected to the impregnation polymerization is preferably from 3 to 18% by weight, more preferably from 5 to 15% by weight, particularly preferably from 5 to 10% by weight on the basis of the modified polystyrene resin particles (a) from a point of giving a good break resistance to a foamed article.

As the styrene monomer, there are styrene derivatives in addition to styrene. Examples of the styrene derivative are, for instance, α-methylstyrene, α-ethylstyrene, α-chlorostyrene and divinylbenzene. Those styrene monomers can be used solely or in a mixture thereof. Divinylbenzene is useful in case of a combination use with a styrene monomer other than divinylbenzene.

Further non-essential other monomer may be added as a copolymerizing component to an extent not changing properties of the rubber polymer particles (b) substantially.

The polymerization of the monomer mixture is carried out by using a polymerization initiator. The polymerization may be carried out by impregnating the monomer mixture to which the initiator is previously added, into the resin particles (a). It is preferable, in order to obtain the rubber polymer particles (b) in more uniform dispersion state, that the polymerization is carried out after impregnating the monomer mixture uniformly into the resin particles and then impregnating the initiator uniformly.

Examples of the polymerization initiator are, for instance, radical polymerization initiators such as benzoyl peroxide, lauroyl peroxide, t-butyl peroxybenzoate and 1,1-di-t-butylperoxy-2,4-di-t-butylcyclohexane. The amount of the polymerization initiator is from 0.05 to 5% by weight, preferably 0.1 to 2% by weight on the basis of the conjugated diene monomer.

The first impregnation polymerization can be carried out in the system where the polystyrene resin particles (a) are dispersed and suspended in water by impregnating with the monomer mixture and polymerization initiator uniformly at a polymerization temperature (usually 50° to 100° C.) or a temperature lower than that and then holding at the polymerization temperature for 1 to 20 hours (impregnation suspension polymerization).

In case of the suspension impregnation polymerization, in order to enhance dispersibility of the polystyrene resin particles (a), there can be used a dispersing agent, for example, an organic dispersing agent such as partly saponified polyvinyl alcohol, polyacrylate, polyvinyl pyrrolidone, carboxymethyl cellulose or methyl cellulose; an inorganic dispersing agent such as calcium pyrophosphate, calcium phosphate, calcium carbonate, magnesium pyrophosphate, magnesium phosphate, magnesium carbonate or magnesium oxide, and the like. In case where the inorganic dispersing agent is used, a combination use of a surfactant is desirable.

In the obtained modified polystyrene resin particles (c1), the rubber polymer particles (b) are dispersed uniformly throughout a continuous phase of the polystyrene resin or in a state of a density of the particles (b) being higher in the center portion of the resin particle than in the surface layer portion thereof. It is preferable that a circle equivalent diameter of average area of the rubber polymer particles (b) being present in the center portion is 0.01 to 0.20 μm.

From the viewpoint of enhancing fusing property at the time when pre-expanded particles are fused by in-mold molding, the modified polystyrene resin particles (c1) may be further impregnation-polymerized with a styrene monomer. This impregnation polymerization is called second impregnation polymerization. The modified polystyrene resin particles obtained by the second impregnation polymerization are called modified polystyrene resin particles (c2). Examples of the styrene monomer used in the second impregnation polymerization are the styrene monomers exemplified in the first impregnation polymerization. The styrene monomer used may be the same as or different from that in the monomer mixture.

The amount of the styrene monomer used in the second impregnation polymerization is from 3 to 50% by weight, preferably from 5 to 30% by weight, further preferably 5 to 20% by weight on the basis of the polystyrene resin particles (a). When more than 50% by weight, there is a case where the weight amount of the rubber polymer particles becomes relatively too small and break resistance of a foamed article becomes insufficient. When less than 3% by weight, improvement in fusion of the particles tends to be lowered.

In the second impregnation polymerization, a conjugated diene monomer may be added to an extent not affecting an effect of enhancement of fusion. Examples of the conjugated diene monomer used are the conjugated diene monomers exemplified in the first impregnation polymerization. The conjugated diene monomer used may be the same as or different from that in the monomer mixture. Also other monomer may be added to an extent not affecting an intended break resistance, fusion between the particles and cushioning property.

The polymerization initiator to be used may be the same as that used in the first impregnation polymerization. The amount of the polymerization initiator is usually from 0.05 to 5% by weight, preferably from 0.5 to 2% by weight on the basis of the styrene monomer to be used in the second impregnation polymerization, but may be decreased when there remains the polymerization initiator which was not consumed in the first impregnation polymerization.

The rubber polymer of rubber polymer particles (b) contained in the so-obtained modified polystyrene resin particles (c) has a base structure of random copolymer comprising the styrene monomer and conjugated diene monomer because the both of styrene monomer and conjugated diene monomer are radically polymerized in a state of being contained uniformly in the polystyrene resin particle (a). The rubber polymer has such a structure that a part of the random copolymer is grafted on a polystyrene chain of the polystyrene resin particle (a) or a styrene polymer derived from the styrene monomer impregnated in the second impregnation polymerization is graft-polymerized with the polymer obtained in the first impregnation polymerization and further there is crosslinking therebetween. Thus the modified polystyrene resin particles (c) have a structure having no blocked portion consisting of the conjugated diene monomer unit. Namely the rubber polymer particles (b) contained in the modified polystyrene resin particles (c) of the present invention has a structure entirely different from that of rubber polymer particles (having a long chain consisting of a butadiene unit) of conventional high impact polystyrene resin (HIPS) prepared by polymerizing a styrene monomer solely in a state of a styrene-butadiene block copolymer or a straight chain polybutadiene being dissolved in the styrene monomer. Also from this point of view, the modified polystyrene resin particles (c) of the present invention can be discriminated from conventional high impact polystyrene resin (for example, JP-B-47-18428, JP-A-7-90105, JP-A-5-116227, JP-A-8-188669, JP-A-8-245822, U.S. Pat. No. 4,409,338, U.S. Pat. No. 5,880,166, U.S. Pat. No. 5,661,191, etc.).

Further since the modified polystyrene resin particles of the present invention have a graft structure and crosslinking structure as mentioned above, they have a gel content higher than that of conventional HIPS. A preferred gel content is 15 to 40% by weight, further 20 to 35% by weight, particularly 23 to 35% by weight. When the gel content is in that range, a good fusion between the expanded particles is obtained and break resistance and cushioning property of a foamed article are excellent. In JP-A-6-49263 (particle containing rubber polymer particles densely in a surface portion thereof), a gel content of the particle described therein is in a wide range of 0.1 to 35% by weight, but the gel content of the actually obtained particle is described as small as 1.8 to 9.3% by weight and a particle having a gel content of not less than 15% by weight is not prepared.

Figure 7:
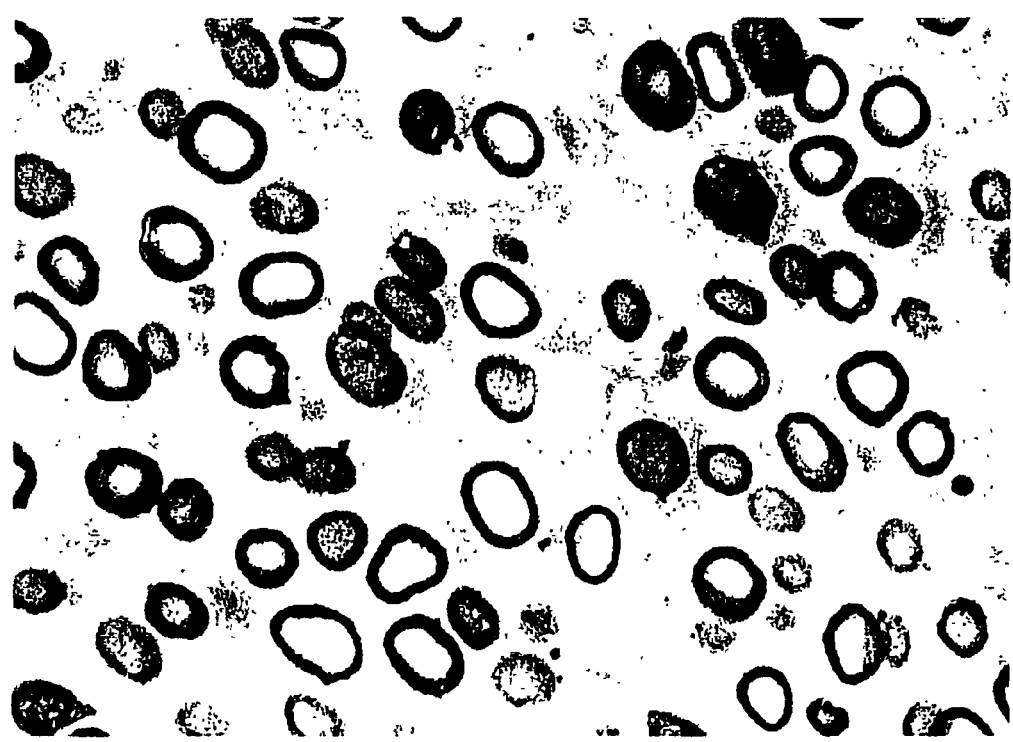
FIG. 7 is a photograph (×40000) of a transmission electron microscope showing the foamed article obtained in Comparative Example 4.

Also as mentioned above, since conventional high impact polystyrene (HIPS) is prepared by polymerizing a styrene monomer after dissolving a rubber polymer in the styrene monomer, polystyrene resin fine particles are contained substantially in rubber polymer particles being present in HIPS (commonly called occlusion polystyrene (occlusion PS) which can be recognized through a transmission electron microscope by dyeing with osmium oxide. Refer to FIG. 7.). However in the preparation process of the present invention for forming the rubber polymer particles (b) by impregnating the polystyrene resin particles (a) with the monomer mixture, so-called occlusion polystyrene is not recognized in the rubber polymer particles (b) in the obtained modified polystyrene resin particles (c) even by viewing through a transmission electron microscope at a magnification of ×40000 by dyeing with osmium oxide (cf. FIG. 1). Namely the rubber polymer particles (b) are featured by consisting essentially of a copolymer of the styrene monomer and the conjugated diene monomer. From this point of view, the modified polystyrene resin particles of the present invention can be discriminated from the above-mentioned conventional HIPS. As mentioned above, the copolymer of styrene monomer and conjugated diene monomer may contain other monomer as a non-essential third component in a range not affecting properties of the rubber polymer particles (b) as a rubber. When the styrene monomer is contained in the monomer mixture in a considerably large amount, there is a case where a copolymer being rich in the styrene monomer unit is present together, but such a copolymer is not an occlusion polystyrene.

Further since the preparation process of the present invention differs from that of conventional high impact polystyrene resin (HIPS) as mentioned above, in the rubber polymer particles (b) contained in the modified polystyrene resin particles (c), there exist many rubber polymer particles having a shape which cannot be said to be spherical. Particularly there is a feature that relatively large rubber polymer particles have a corner or are bent (cf. FIG. 1). Also from this point of view, the resin particles of the present invention can be discriminated from conventional HIPS and particles prepared by impregnation polymerization and disclosed in JP-A-6-49263 or WO98/29485.

The foamable modified polystyrene resin particles (d) of the present invention are those in which the blowing agent (e) is contained in the modified polystyrene resin particles (c). The blowing agent (e) may be introduced into the modified polystyrene resin particles (c), may be introduced together with the monomer mixture during the first impregnation polymerization or may be impregnated together with the styrene monomer during the second impregnation polymerization. When the second impregnation polymerization is carried out, it is preferable that the impregnation of the blowing agent is done after the second impregnation polymerization from the points that a pressure inside a reactor is not required to be made high and a dispersion stability is good.

The blowing agent (e) is preferably of volatile type. For example, there are one or two or more of butane, pentane, and the like. Among them, preferred is a sole use of butane and pentane or a mixture thereof. Also a small amount of cyclohexane, cyclopentane, hexane, and the like may be used together. Particularly pentane is preferred (including a sole use of normal pentane and isopentane or a mixture thereof).

A content of the blowing agent in the foamable modified polystyrene resin particles (d) may be the same as in the case of un-modified polystyrene resin particles, and may be selected in a range of 3 to 15 parts by weight, usually 5 to 10 parts by weight on the basis of 100 parts by weight of resin particles in consideration of a desired expansion ratio.

Further a solvent may be used to improve an expansion rate. Suitable solvents are, for example, cyclohexane and aromatic hydrocarbons such as toluene, xylene and ethylbenzene.

The present invention further relates to the method of producing a foamed article by expanding the foamable modified polystyrene resin particles (d) of the present invention and to the foamed article. As mentioned above, the foamed article of the present invention encompasses pre-expanded particles obtained by expanding the foamable modified polystyrene resin particles and also an expansion-molded article obtained by molding the pre-expanded particles in mold.

First, the pre-expanded particles are explained below. The pre-expanded particles are obtained by impregnating modified or unmodified polystyrene resin particles with the blowing agent and then heating, for example, with steam or the like for the expansion. The pre-expansion method is a well known technique and can be used for the present invention as it is.

The pre-expanded particles of the present invention have break resistance and can be used as they are for a loose fill type cushioning material. They are particularly useful as a material for a foamed article obtained by in-mold molding which is explained next.

The in-mold molding is a well known method for producing a foamed article by putting the pre-expanded particles in the mold and heating for fusion between the pre-expanded particles. In the present invention, usual pre-expanding conditions may be properly selected.

The thus produced foamed article has sufficient fusion between the pre-expanded particles, and high break resistance is exhibited.

Further the inventors of the present invention have found that when a foamed article is produced by using the foamable modified polystyrene resin particles (d) obtained from the modified polystyrene resin particles (c) containing the blowing agent (e) and comprising the polystyrene resin and rubber polymer particles (b) dispersed in a continuous phase of the resin, particularly a balance of break resistance and cushioning property is excellent when a 50% failure height according to falling weight method and a cushioning coefficient of the foamed article satisfy specific equations.

Namely provided that a cushioning coefficient of the modified polystyrene resin foamed article having a density of 0.02 g/cm$^3$ and obtained from the foamable modified polystyrene resin particles (d) is represented by A and a 50% failure height according to falling weight method of the modified polystyrene resin foamed article is represented by B and that a cushioning coefficient of un-modified polystyrene resin foamed article having a density of 0.02 g/cm$^3$ and containing no rubber polymer particles is represented by C and a 50% failure height according to falling weight method of the unmodified polystyrene resin foamed article is represented by D, particularly useful as a cushioning material is a foamed article having a relation that a cushioning coefficient ratio A/C is 1.00 to 1.08 and an impact strength ratio B/D is 1.35 to 2.35. Preferably A/C is 1.00 to 1.06 and B/D is 1.45 to 2.35, more preferably A/C is 1.00 to 1.05 and B/D is 1.45 to 2.35. When the cushioning coefficient ratio (A/C) is not less than 1.08 (represented by a foamed article of conventional HIPS), an energy absorbing ability of a foamed article as a cushioning material is low and cushioning performance is inferior. When the impact strength ratio (B/D) is not more than 1.35 (represented by unmodified polystyrene resin foamed article), break resistance tends to become insufficient.

Also the inventors of the present invention have found that when the modified polystyrene resin foamed article is obtained by expanding the foamable modified polystyrene resin particles (d) in which the modified polystyrene resin particles (c) contains the blowing agent (e) and the rubber polymer particles (b) are dispersed uniformly throughout a continuous phase of the polystyrene resin or in a state of a density of the particles (b) being higher in the center portion of the resin particle than in the surface layer portion thereof, the rubber polymer particles being present in a cell membrane of the obtained foamed article are flattened and particularly when the rubber polymer particles are flattened in an average flatness range of 1.1 to 9, excellent break resistance and cushioning property are exhibited. A preferable average flatness is from 1.5 to 8. If the rubber polymer particles are not flattened substantially (average flatness is less than 1.1), break resistance is insufficient when the resin particles are formed into a highly expanded foamed article having a density of not more than 0.02 g/cm$^3$. If the average flatness is increased, there is a tendency that a shrinkage of pre-expanded particles increases, a cushioning coefficient increases and cushioning property becomes inferior.

Figure 5:
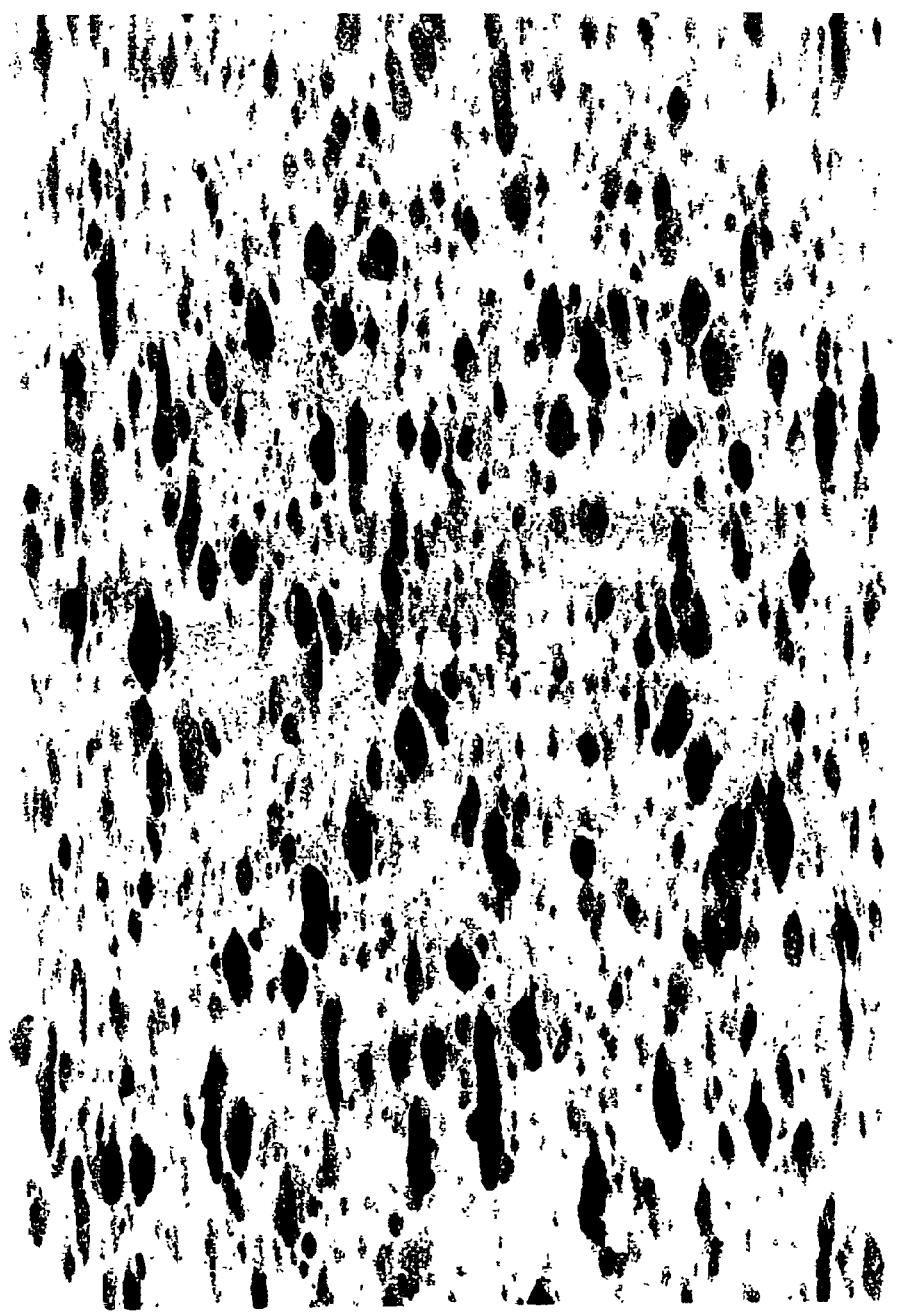
FIG. 5 is a photograph (×40000) of a transmission electron microscope showing the modified polystyrene resin foamed article obtained in Example 2 of the present invention.
Figure 6:
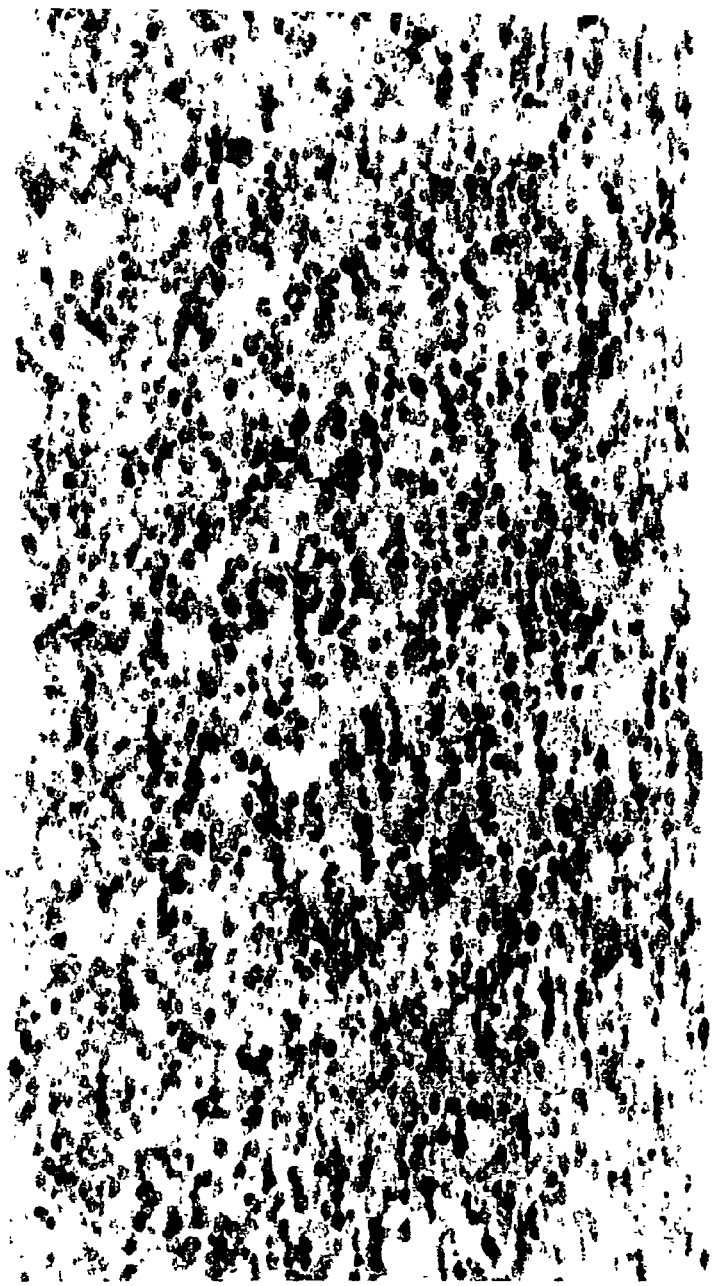
FIG. 6 is a photograph (×40000) of a transmission electron microscope showing the foamed article obtained in Comparative Example 3.

FIG. 5 shows the rubber polymer particles in the cell membrane when the foamable modified polystyrene resin particles corresponding to Example 2 are formed into a foamed article having a density of 0.02 g/cm$^3$. FIG. 6 shows the rubber polymer particles in the cell membrane when the foamable modified polystyrene resin particles of Comparative Example 3 corresponding to foamable resin particles described in WO98/29485 are formed into a foamed article having a density of 0.02 g/cm$^3$. As it is clear from a comparison between FIGS. 5 and 6, it can be seen that in the present invention the rubber polymer particles are adequately flattened in the cell membrane and differ in their properties from those of the foamable resin particles described in WO98/29485 in which the rubber polymer particles are not deformed.

Further the inventors of the present invention have found that with respect to the foamable modified polystyrene resin particles in which the modified polystyrene resin particles contains the blowing agent and the rubber polymer particles are dispersed uniformly throughout a continuous phase of the polystyrene resin or in a state of a density of the particles being higher in the center portion of the resin particle than in the surface layer portion thereof, when the rubber polymer particles being present in the center portion of the foamable modified polystyrene resin particles have a circle equivalent diameter of average area of 0.01 to 0.20 μm, a balance of break resistance and cushioning property of a foamed article obtained by expanding is excellent. When the circle equivalent diameter of average area is not more than 0.01 μm, an impact strength by a falling weight method tends to be decreased, and when not less than 0.20 μm, there is a tendency that a cushioning coefficient is increased to make cushioning property inferior. A preferable circle equivalent diameter of average area is from 0.02 to 0.18 μm, more preferably 0.04 to 0.16 μm, particularly preferably 0.05 to 0.14 μm.

In the present invention, the rubber polymer particles which are not spherical substantially are contained among the rubber polymer particles (b) in the modified polystyrene resin particles (c). This is one of the features of the present invention. In that case, there is a case where it is difficult to obtain an average particle size of the rubber polymer particles, and therefore the particle size is represented by the circle equivalent diameter of average area obtained from an area of the rubber polymer particles as mentioned above.

A difference between the foamable polystyrene resin particles (d) of the present invention and some conventional foamable polystyrene resin particles is as mentioned above. Then a difference from another known foamable polystyrene resin particles and foamed article is explained briefly in other aspects.

A foamed article obtained from usual high impact polystyrene resin (HIPS) has an impact strength ratio by a falling weight method in a wide range of from 0.6 to 2.0. However from a production condition that a styrene monomer is solely polymerized in the presence of a rubber polymer (in a dissolved state), a molecular weight of a polystyrene portion is hard to be increased and a re-pelletizing step for forming into particles is required and a production cost is increased. Also a cushioning coefficient ratio of a foamed article of the high impact polystyrene resin (HIPS) becomes not less than 1.08, and therefore it is hard to say that cushioning property is so excellent. It is understood in general that unless the rubber polymer particles are relatively large, for example, unless a particle size thereof is 1 to 2 μm or more, good properties are not exhibited.

JP-A-8-188669 discloses foamable rubber-modified styrene resin particles obtained from rubber-modified styrene resin particles which comprise 8 to 15% by weight of butadiene rubber particles having a 1,4-cis structure in a proportion of not less than 70% by weight and an average particle size of 1.5 to 3.0 μm and a styrene resin (Z average molecular weight: not less than 350,000) and have a mineral oil content of not more than 3% by weight and a blowing agent content of from 1 to 20% by weight. In order to increase a proportion of 1,4-cis structure to 70% by weight or more, it is necessary to employ a specific polymerization method specially regulated such as ion polymerization. On the other hand, in the present invention, the styrene monomer and conjugated diene monomer are subjected to radical polymerization in an entirely unconditioned state to give a random copolymer. In that case a proportion of 1,4-cis structure is very low. In that point, the rubber polymer particles of the present invention completely differ from those described in JP-A-8-188669. Further a particle size of the rubber polymer particles of JP-A-8-188669 is the same as that of usual HIPS resin particles, and also from this point of view, the invention of JP-A-8-188669 differs from the present invention in which the particle size of the rubber polymer particles is relatively small.

JP-A-7-11043 describes that a foamed article of high impact polystyrene resin (HIPS) in which rubber polymer particles are flattened in a range of L/D of 10 to 70 has a high break resistance. However the resin is HIPS and a preparation process thereof differs from that of the present invention. Further the rubber polymer particles have a structure like salami or a core-shell structure and the structure and properties are entirely different from those of the present invention and therefore a preferred average flatness is in a completely different range.

Also JP-A-56-67344 describes a polymer composition obtained by an entirely different preparation process by using a resin which is neither usual HIPS resin nor the resin of the present invention prepared by impregnation polymerization. Namely high impact resin particles are prepared by dissolving a straight chain styrene/butadiene block copolymer and a straight chain polybutadiene in toluene, removing toluene by solvent casting method, and then crosslinking polybutadiene at 140° C. In that invention, since the steps of dissolving in the solvent and then removing the solvent by the solvent casting method are employed, the rubber portion thereof has a micro phase separation structure of styrene component and conjugated diene polymer component, and a particle size of the rubber portion is smaller as compared with that of HIPS resin though the both resins are equal from a point that the rubber portions thereof are block copolymers. However the preparation steps are not practical because a cost is too high. Further the particles of the rubber portion contain a blocked polybutadiene in a large amount and differ in a structure, properties and characteristics from the rubber polymer particles of the present invention which basically comprise a random copolymer of a styrene monomer and conjugated diene monomer.

The features and preferred embodiments of the present invention and differences from known techniques are as explained above. Then the present invention is explained below by means of examples, but is not limited to them.

EXAMPLES 1 TO 5

A 5-liter reactor with a stirrer was charged with an aqueous suspension comprising 110 parts (part by weight, hereinafter the same) of water, 0.013 part of sodium a-olefin sulfonate, 0.44 part of calcium phosphate and polystyrene particles having an average particle size of 1 mm in an amount shown in Table 1, and then was sealed. With stirring, the mixture was heated to 80° C., and impregnated with a monomer mixture in an amount shown in Table 1. As the initiator, 0.066 part of lauroyl peroxide was added, followed by the first impregnation polymerization for six hours.

Then the reactor was heated to 90° C. and 10.1 parts of styrene and 0.049 part of benzoyl peroxide were added additionally over one hour, followed by heating to 115° C. over one hour and conducting the second impregnation polymerization for two hours.

Subsequently 6.6 parts of pressurized pentane (normal-pentane/iso-pentane=40/60) was introduced as a blowing agent and impregnation of pentane was carried out at 115° C. for two hours. The mixture was then cooled to 30° C. and taken out of the reactor, followed by dehydrating and drying to give foamable modified polystyrene particles of the present invention.

The obtained foamable resin particles were pre-expanded by about 50 times under the above-mentioned conditions to give pre-expanded particles having a density of 0.02 g/cm$^3$. The pre-expanded particles were allowed to stand for 24 hours, followed by in-mold molding under the above-mentioned conditions to give a foamed article.

EXAMPLE 6

A 5-liter reactor with a stirrer was charged with an aqueous suspension comprising 110 parts of water, 0.013 part of sodium a-olefin sulfonate, 0.44 part of calcium phosphate and polystyrene particles having an average particle size of 1 mm in an amount shown in Table 1, and then was sealed. With stirring, the mixture was heated to 80° C., and impregnated with a monomer mixture in an amount shown in Table 1. As the initiator, 0.066 part of lauroyl peroxide was added, followed by the first impregnation polymerization for six hours. Then the reactor was heated to 115° C., followed by post-polymerization for two hours.

Subsequently 6.6 parts of pressurized pentane (normal-pentane/iso-pentane=40/60) was introduced as a blowing agent and impregnation of pentane was carried out at 115° C. for two hours. The mixture was then cooled to 30° C. and taken out of the reactor, followed by dehydrating and drying to give foamable modified polystyrene particles of the present invention.

The obtained foamable resin particles were pre-expanded by about 50 times in the same manner as in Example 1 to give pre-expanded particles having a density of 0.02 g/cm$^3$. The pre-expanded particles were subjected to in-mold molding to give a foamed article.

COMPARATIVE EXAMPLE 1

Foamable polystyrene particles were obtained in the same manner as in Example 1 except that a blowing agent (normal-pentane/iso-pentane=40/60) was impregnated without modifying (impregnation polymerization) raw polystyrene particles. The obtained foamable resin particles were subjected to pre-expanding and in-mold molding in the same manner as in Example 1 to give a foamed article.

COMPARATIVE EXAMPLE 2

A 5-liter reactor with a stirrer was charged with an aqueous suspension comprising 96 parts of water, 0.0096 part of sodium α-olefin sulfonate, 0.32 part of calcium phosphate and 80 parts of polystyrene particles having an average particle size of 1 mm, and then was sealed.

Separately 8 parts of a styrene monomer and 12 parts of butadiene were mixed under pressure to give a liquid monomer mixture. To the monomer mixture were added 0.1 part of benzoyl peroxide and 0.025 part of t-butyl peroxybenzoate as a polymerization initiator to give a mixture.

The obtained mixture was added in the reactor and dispersed together with polystyrene particles in an aqueous medium. The dispersion was stirred at 60° C. for two hours and the mixture was absorbed in the polystyrene particles. The dispersion was then heated to 90° C. and held for four hours and further heated to 125° C. and held for two hours to copolymerize styrene with butadiene. The dispersion was then cooled to 100° C. and thereto was added 10 parts of pressurized pentane as a blowing agent, followed by holding for six hours to impregnate the particles with the blowing agent. The dispersion was cooled to 30° C., taken out of the reactor, and then dehydrated and dried to give foamable polystyrene particles.

This Comparative Example corresponds to the invention disclosed in JP-A-6-49263.

COMPARATIVE EXAMPLE 3

Foamable polystyrene particles were obtained in the same manner as in Example 1 except that an amount of a monomer mixture was changed to that shown in Table 2. The obtained foamable resin particles were subjected to pre-expanding and in-mold molding in the same manner as in Example 1 to give a foamed article.

This Comparative Example corresponds to the invention disclosed in WO98/29485.

COMPARATIVE EXAMPLE 4

A high impact polystyrene resin (HIPS, rubber content: 8%, molecular weight of a polystyrene portion: 230000) was extruded and cut to give small particles of about 1 mg. Those resin particles were impregnated with a blowing agent in the same manner as in Example 1 to give foamable high impact polystyrene resin particles which were then subjected to pre-expanding and in-mold molding in the same manner as in Example 1 to give a foamed article.

COMPARATIVE EXAMPLE 5

Foamable polystyrene particles were obtained in the same manner as in Example 1 except that an amount of a monomer mixture was changed to that shown in Table 2. The obtained foamable resin particles were subjected to pre-expanding and in-mold molding in the same manner as in Example 1 to give a foamed article.

Comparative Example 5 corresponds to the invention disclosed in WO98/29485.

The results of evaluation of the foamable modified polystyrene resins and foamed articles in Examples 1 to 6 and Comparative Examples 1 to 5 are shown in Table 1 (Examples) and Table 2 (Comparative Examples). In Table 1, Bd and St represent butadiene and styrene, respectively.

TABLE 1

|  | Example | | | | | |
|---|---|---|---|---|---|---|
|  | 1 | 2 | 3 | 4 | 5 | 6 |
| Preparation of foamable PS particles (d) | | | | | | |
| Amount of raw PS particles (a) (part by weight) | 79 | 75 | 73 | 68 | 83 | 75 |
| First impregnation polymerization | | | | | | |
| Monomer mixture (part by weight) | 21 | 25 | 27 | 32 | 17 | 25 |
| Styrene (% by weight) | 57 | 64 | 67 | 72 | 65 | 64 |
| Butadiene (% by weight) | 43 | 36 | 33 | 28 | 35 | 36 |
| Second impregnation polymerization | | | | | | |
| Styrene (part by weight) | 10.1 | 10.1 | 10.1 | 10.1 | 10.1 | — |
| Physical properties of foamable PS particles (d) | | | | | | |
| Shape of rubber polymer particles | Non-spherical | Non-spherical | Non-spherical | Non-spherical | Non-spherical | Non-spherical |
| Distribution of rubber polymer particles (b) | Uniform | Uniform | Uniform | Uniform | Uniform | Uniform |
| Existence of occlusion PS | None | None | None | None | None | None |
| Area ratio of rubber portion | 0.75 | 0.66 | 0.64 | 0.63 | 0.72 | 0.90 |
| Circle equivalent diameter of average area ($\mu$m) | 0.08 | 0.09 | 0.09 | 0.11 | 0.07 | 0.08 |
| Gel content (% by weight) | 25.3 | 30.2 | 32.2 | 33.4 | 22.0 | 26.5 |
| Physical properties of foamed article | | | | | | |
| Impact strength according to the falling weight method (cm) | 17 | 23 | 20 | 18.5 | 18 | 22 |
| Impact strength ratio | 1.36 | 1.84 | 1.60 | 1.48 | 1.44 | 1.76 |
| Cushioning coefficient | 2.93 | 2.92 | 2.91 | 2.90 | 2.90 | 2.91 |
| Cushioning coefficient ratio | 1.05 | 1.04 | 1.04 | 1.04 | 1.04 | 1.04 |
| Average flatness | 3.2 | 3.6 | 4.0 | 4.8 | 3.6 | 3.6 |

TABLE 2

|  | Comparative Example | | | | |
|---|---|---|---|---|---|
|  | 1 | 2 | 3 | 4 | 5 |
| Preparation of foamable PS particles (d) | | | | | |
| Amount of raw PS particles (a) (part by weight) | 100 | 80 | 90 | — | 85 |
| First impregnation polymerization | | | | | |
| Monomer mixture (part by weight) | — | 20 | 10 | — | 15 |
| Styrene (% by weight) | — | 40 | 0 | — | 33 |
| Butadiene (% by weight) | — | 60 | 100 | — | 67 |
| Second impregnation polymerization | | | | | |
| Styrene (part by weight) | — | | 10 | — | 10.1 |
| Physical properties of foamable PS particles (d) | | | | | |
| Shape of rubber polymer particles | — | Non-spherical | Spherical | Spherical | Non-spherical |
| Distribution of rubber polymer particles (b) | Uniform | High density around surface | Uniform | Uniform | Uniform |
| Existence of occlusion PS | — | None | None | Found | None |
| Area ratio of rubber portion | — | 1.17 | 0.87 | — | 0.97 |
| Circle equivalent diameter of average area ($\mu$m) | — | 0.01 | 0.01 | 0.2 | 0.1 |
| Gel content (% by weight) | — | 20 | 15 | 15 | 18 |
| Physical properties of foamed article | | | | | |
| Impact strength according to the falling weight method (cm) | 12.5 | 15 | 14 | 20 | 15 |
| Impact strength ratio | 1.0 | 1.2 | 1.12 | 1.6 | 1.2 |
| Cushioning coefficient | 2.80 | 2.95 | 2.98 | 3.04 | 2.96 |
| Cushioning coefficient ratio | 1.00 | 1.05 | 1.06 | 1.09 | 1.06 |
| Average flatness | — | — | 1 | 20 | 1.0 |

As mentioned above, the foamable modified polystyrene resin particles and foamed article of the present invention can provide a foamed article excellent in break resistance as shown in Table 1. In Comparative Examples shown in Table 2, particularly in Comparative Examples 3 and 5, in which foamable modified polystyrene resin particles (WO98/29485) containing rubber polymer particles which are not deformed substantially after expanding are used, impact resistance and break resistance are enhanced.

Industrial Applicability

According to the present invention, there can be provided a modified polystyrene foamed article having excellent break resistance and high fusion rate and foamable modified polystyrene resin particles which are raw materials for producing the foamed article. Such a modified polystyrene resin foamed article can be produced at relatively low cost as compared with an expensive high impact polystyrene resin foamed article.

The foamed article of the present invention can be used for applications where high impact polystyrene resin foamed articles have been used, and is useful as a shock absorbing material particularly for precise electric appliances, for example, OA apparatuses such as CRT and printer and AV apparatuses such as audio system and video tape recorder.

What is claimed is:

1. Foamable modified polystyrene resin particles which are foamable modified polystyrene resin particles (d) comprising modified polystyrene resin particles (c) containing a blowing agent (e); said modified polystyrene resin particles (c) comprising a polystyrene resin and rubber polymer particles (b) being dispersed in the resin, wherein the rubber polymer particles (b) are dispersed uniformly throughout a continuous phase of the polystyrene resin or in a state of a density of the particles (b) being higher in a center portion of the resin particle than in a surface layer portion thereof, the rubber polymer particles (b) consist essentially of a copolymer of a styrene monomer and a conjugated diene monomer and the rubber polymer particles (b) are flattened in a cell membrane of the modified polystyrene resin foamed article obtained by expanding the foamable modified polystyrene resin particles and an average flatness of the rubber polymer particles (b) flattened in the cell membrane of the modified polystyrene resin foamed article obtained by expanding the foamable modified polystyrene resin particles (d) is within a range of 1.1 to 9, and the modified polystyrene resin particles (c) are modified polystyrene resin particles (c1) obtained by impregnating a monomer mixture consisting essentially of a styrene monomer and a conjugated diene monomer into polystyrene resin particles (a) and carrying out copolymerization, said monomer mixture containing the styrene monomer in an amount of more than 55% by weight and not more than 90% by weight and the conjugated diene monomer in an amount of not less than 10% by weight and less than 45% by weight.

2. The foamable modified polystyrene resin particles of claim 1, wherein said modified polystyrene resin particles (c) are modified polystyrene resin particles (c2) obtained by copolymerizing the monomer mixture consisting essentially of the styrene monomer and the conjugated diene monomer and containing the styrene monomer in an amount of more than 55% by weight and not more than 90% by weight and than the conjugated diene monomer in an amount of not less than 10% by weight and less than 45% by weight with the monomer mixture being impregnated in the polystyrene resin particles (a) to give the modified polystyrene resin particles (c1) and further subjecting the resin particles (c1) to impregnation polymerization of a styrene monomer.

3. The foamable modified polystyrene resin particles of claim 1, wherein said modified polystyrene resin particles (c1) are prepared by impregnating 40 to 10 parts by weight of the monomer mixture into 60 to 90 parts by weight of polystyrene polymer particles (a) and carrying out copolymerization.

4. The foamable modified polystyrene resin particles of claim 2, wherein said modified polystyrene resin particles (c1) are prepared by impregnating 40 to 10 parts by weight of the monomer mixture into 60 to 90 parts by weight of polystyrene polymer particles (a) and carrying out copolymerization.

5. The foamable modified polystyrene resin particles of claim 1, wherein provided that when the foamable modified polystyrene resin particles (d) are molded into a modified polystyrene resin foamed article having a density of 0.02 $g/cm^3$, a cushioning coefficient is represented by A and a 50% failure height according to falling weight method of the foamed article is represented by B, and that when foamable un-modified polystyrene resin particles (f) prepared by impregnating the polystyrene resin particles (a) with the blowing agent (e) are molded into an un-modified polystyrene resin foamed article having a density of 0.02 $g/cm^3$, a cushioning coefficient is represented by C and a 50% failure height according to falling weight method of the foamed article is represented by D, the modified polystyrene resin foamed article has a relation that A/C is 1.00 to 1.08 and B/D is 1.35 to 2.35.

6. The foamable modified polystyrene resin particles of claim 1, wherein the rubber polymer particles (b) being present in the center portion of the foamable modified polystyrene resin particles (d) have a circle equivalent diameter of average area of 0.01 to 0.20 $\mu$m and a gel content of the modified polystyrene resin particles (c) is from 15 to 40% by weight.

7. The foamable modified polystyrene resin particles of claim 4, wherein the rubber polymer particles (b) being present in the center portion of the foamable modified polystyrene resin particles (d) have a circle equivalent diameter of average area of 0.01 to 0.20 $\mu$m and a gel content of the modified polystyrene resin particles (c) is from 15 to 40% by weight.

8. The foamable modified polystyrene resin particles of claim 4, wherein provided that when the foamable modified polystyrene resin particles (d) are molded into a modified polystyrene resin foamed article having a density of 0.02 $g/cm^3$, a cushioning coefficient is represented by A and a 50% failure height according to falling weight method of the foamed article is represented by B, and that when foamable unmodified polystyrene resin particles (t) prepared by impregnating polystyrene resin particles (a) with the blowing agent (e) are molded into an un-modified polystyrene resin foamed article having a density of 0.02 $g/cm^3$, a cushioning coefficient is represented by C and a 50% failure height according to falling weight method of the foamed article is represented by D, the modified polystyrene resin foamed article has a relation that A/C is 1.00 to 1.08 and B/D is 1.35 to 2.35.

9. Foamable modified polystyrene resin particles which are foamable modified polystyrene resin particles (d) comprising modified polystyrene resin particles (c) containing a blowing agent (e); said modified polystyrene resin particles (c) comprising a polystyrene resin and rubber polymer particles (b) being dispersed in the resin, wherein the rubber polymer particles (b):

are dispersed uniformly throughout a continuous phase of the polystyrene resin or in a state of a density of the particles (b) being higher in a center portion of the resin particle than in a surface layer portion thereof, consist essentially of a copolymer of a styrene monomer and a conjugated diene monomer and are flattened in a cell membrane of a modified polystyrene resin foamed article obtained by expanding the foamable modified polystyrene resin particles (d); and an average flatness of the rubber polymer particles (b) flattened in a cell membrane of the modified polystyrene resin foamed article obtained by expanding the foamable modified polystyrene resin particles (d) and having a density of 0.02 /cm$^3$ is within a range of 1.1 to 9.

10. The foamable modified polystyrene resin particles of claim 9, wherein provided that when the foamable modified polystyrene resin particles (d) are molded into a modified polystyrene resin foamed article having a density of 0.02 g/cm$^3$, a cushioning coefficient is represented by A and a 50% failure height according to falling weight method of the foamed article is represented by B, and that when foamable un-modified polystyrene resin particles (f) prepared by impregnating polystyrene resin particles (a) with the blowing agent (e) are molded into an un-modified polystyrene resin foamed article having a density of 0.02 g/cm$^3$, a cushioning coefficient is represented by C and a 50% failure height according to falling weight method of the foamed article is represented by D, the modified polystyrene resin foamed article has a relation that A/C is 1.00 to 1.08 and B/D is 1.35 to 2.35.

11. The foamable modified polystyrene resin particles of claim 9, wherein the rubber polymer particles (b) being present in the center portion of the foamable modified polystyrene resin particles (d) have a circle equivalent diameter of average area of 0.01 to 0.20 μm and a gel content in the modified polystyrene resin particles (c) is from 15 to 40% by weight.

12. The foamable modified polystyrene resin particles of claim wherein the rubber polymer particles (b) being present in the center portion of the foamable modified polystyrene resin particles (d) have a circle equivalent diameter of average area of 0.01 to 0.20 μm, a gel content in the modified polystyrene resin particles (c) is from 15 to 40% by weight.

13. The modified polystyrene resin foamed article obtained by expanding the foamable modified polystyrene resin particles of claim 4.

14. The modified polystyrene resin foamed article obtained by expanding the foamable modified polystyrene resin particles of claim 8.

15. The modified polystyrene resin foamed article obtained by expanding the foamable modified polystyrene resin particles of claim 10.

16. The modified polystyrene resin foamed article obtained by expanding the foamable modified polystyrene resin particles of claim 12.

17. A process for preparing foamable modified polystyrene resin particles comprising:

impregnating, into polystyrene resin particles (a), a monomer mixture consisting essentially of a styrene monomer and a conjugated diene monomer and comprising the styrene monomer in an amount of more than 55% by weight and not more than 90% by weight and than the conjugated diene monomer in an amount of not less than 10% by weight and less than 45% by weight and carrying out copolymerization to give modified polystyrene resin particles (c1), impregnation-polymerizing the modified polystyrene resin particles (c1) with a styrene monomer to give modified polystyrene resin particles (c2), and impregnating the modified polystyrene resin particles (c2) with a blowing agent (e).

18. The process for preparing foamable modified polystyrene resin particles of claim 17, wherein in the impregnation polymerization for preparing the modified polystyrene resin particles (c1), 40 to 10 parts by weight of the monomer mixture is impregnated into 60 to 90 parts by weight of the polystyrene polymer particles (a).

19. The foamable modified polystyrene resin particles of claim 1, wherein the average flatness of the rubber polymer particles (b) flattened in a cell membrane of the modified polystyrene resin foamed article obtained by expanding the foamable modified polystyrene resin particles (d) and having a density of 0.02 g/cm$^3$ is within a range of 1.5 to 8.

20. The foamable modified polystyrene resin particles of claim 9, wherein the average flatness of the rubber polymer particles (b) flattened in a cell membrane of the modified polystyrene resin foamed article obtained by expanding the foamable modified polystyrene resin particles (d) and having a density of 0.02 g/cm$^3$ is within a range of 1.5 to 8.

* * * * *